(12) United States Patent
Ball

(10) Patent No.: US 6,227,147 B1
(45) Date of Patent: *May 8, 2001

(54) CAT EXCREMENT SYSTEM

(76) Inventor: Daniel Ball, 2079 Antoine Dr., Houston, TX (US) 77055

( * ) Notice: Subject to any disclaimer, the term of this patent is extended or adjusted under 35 U.S.C. 154(b) by 0 days.

This patent is subject to a terminal disclaimer.

(21) Appl. No.: 09/461,871

(22) Filed: Dec. 15, 1999

Related U.S. Application Data

(63) Continuation of application No. 08/943,974, filed on Oct. 7, 1997, now Pat. No. 6,014,949.

(51) Int. Cl.⁷ ................................................. A01K 29/00
(52) U.S. Cl. .......................................... 119/484; 119/500
(58) Field of Search ............................. 119/484, 486, 119/500; 454/200, 208, 210

(56) References Cited

U.S. PATENT DOCUMENTS

| | | | |
|---|---|---|---|
| 5,134,972 | * 8/1992 | Compagnucci | 119/500 |
| 5,140,948 | * 8/1992 | Roberts | 119/500 |
| 5,315,964 | * 5/1994 | Mimms et al. | 119/500 |
| 5,738,040 | * 4/1998 | Simmons | 119/500 |

* cited by examiner

Primary Examiner—Charles T. Jordan
Assistant Examiner—Elizabeth Shaw
(74) Attorney, Agent, or Firm—Wendy K. Buskop; Buskop Law Group

(57) ABSTRACT

The present invention is a cat toilet with air expulsion apparatus to remove noxious odor away and out of the pet owners home.

7 Claims, 1 Drawing Sheet

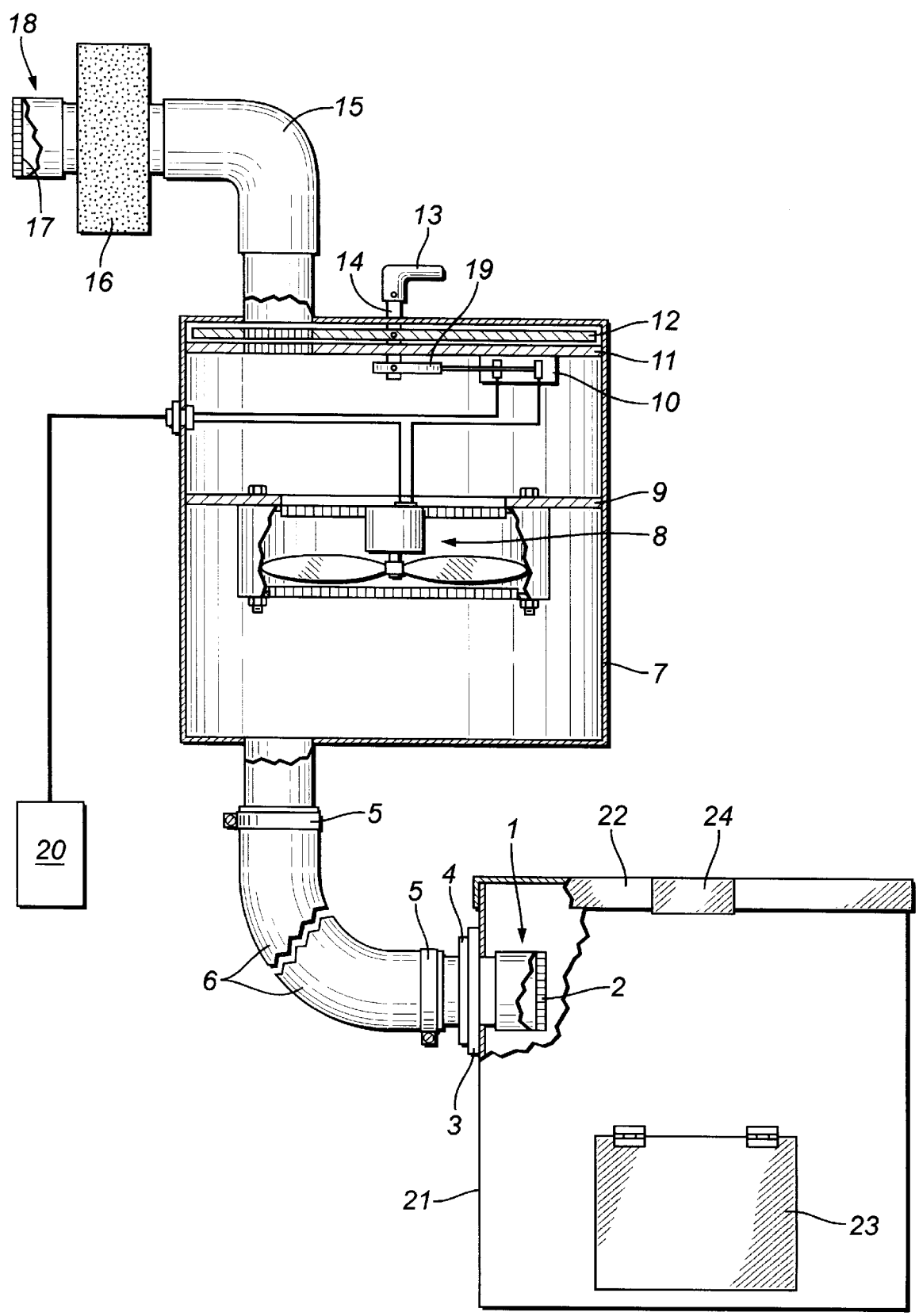

CAT EXCREMENT SYSTEM

This is a continuation in part of 08/943,974 filed Oct. 7, 1997; which issued on Jan. 18, 2000 now U.S. Pat. No. 6,014,949.

BACKGROUND OF THE INVENTION

This invention relates to air treatment of the surroundings of a house pet, such as a cat or dog.

The invention relates to a variation of an invention, which is the subject of a copending patent application, which is a method for transferring preconditioned air from human domicile to doghouse. The average dog house has a floor, roof and four walls. There is an opening in one end for entry. Dog houses are generally positioned in the back yard of the owners home. They are too hot or cold, stuffy and damp, therefore are seldom used. Geographically transplanted animals suffer most. (Such as Alaskan Huskies in Houston, Tex.). It is not always convenient to have your animal in the house. Even letting them in and our can sometimes be dangerous. (We forget!) There are also many diseases and parasites associated with lying on the open ground. A climate controlled, guilt free, safe house on the outside of the home that would always be accessible to the animal would be highly desirable to both pet and owner. The most common reason, (according to the Houston S.P.C.A.), for people abandoning their pets is, "I can't have them in the house and can't stand to see them suffer."

This variation is a cat toilet. The invention utilizes a similar construction for the removal of cat excrement odors from a cat toilet used inside a house to outside of a human house.

OBJECTS OF THE INVENTION

It is an object of the present invention to provide a safe and comfortable toilet for cats to use inside a house with a device, which sucks the nasty odors from the cat toilet and expels them outside of the existing home through a window.

SUMMARY OF THE INVENTION

The cat toilet comprises a box that has an intake and an exhaust. The box has a bottom, top and four sides. It has a snout adapted receive piping from a motor and filter apparatus, which is connected to a house window. In the motor and filter apparatus, there is a flap attached to the innermost portion of the snout to allow airflow when open and seal when shut. The flap also has a short rod attached in such a way as to make and unmake a micro switch turning the box fan on when open and off when shut. There is a box fan. 12 volt, 24 volt or 110 volt electricity can be used. The box fan is mounted at the exhaust at the outer most inside portion of the manifold box. There is a micro switch positioned on the floor of the box adjacent to the wall in relation to the micro switch rod on the flap. There is a fine mesh wire bug screen inserted and removable at the inside portion of the snout. There is a two inch tube protruding out from the outermost portion of the manifold box as a joining coupler for flex hose.

BRIEF DESCRIPTION OF THE DRAWINGS

FIG. 1 is a side view of the system.

DETAILED DESCRIPTION

The present invention is a cat excrement odor exhaust system attachable to a house window for flowing air from inside a cat toilet to outside a house. Generally, the system includes a house port attachable to a house window having an intake side and an exhaust side, tubing attached to the intake side of the house port and the exhaust side of the house port and wherein the tubing attached to the intake side of the port is further connected to a cat toilet enclosure, containing a litter box and a most charming curtain, so that the cat can have privacy while using the litter box.

The invention further includes damping means connected to the intake side of the house port to regulate the amount of airflow from the cat toilet enclosure containing the litter box. The damping means is connected to the tubing.

A fan, typically an electric fan, although a wind up fan could be used, is attached to the intake side of the house port to cause air to flow past the damping means and into the intake side of the house port, then through the house port, and into the exhaust side of the house port and further into said tubing which exhausts air outside of a house.

It has been found useful to utilize camming means connected to the damping means and further attached to a micro switch which engages the fan, and wherein the damping means is adjusted to regulate the amount of air flow from inside the cat toilet enclosure to outside the pet owner's house.

Electrical wires are used as connecting means and are wired so as to run inside the tubing connecting the micro switch and the fan to a power source.

A bug screen is removably attached to at least one end of the tubing to prevent bugs from freely moving through the said tubing to the homeowner's house. The screen is very useful to prevent mosquitoes, roaches, moths and even bats from entering the house through the port for the kitty toilet.

The cat toilet enclosure preferably is designed with four walls, a bottom, a removable top, and a port to accept the above-described tubing, an entry door with a curtain and a kitty litter tray.

Other embodiments of this invention include but are not limited to the following additional features. For example, at least one clip could be used with the device for removable locking the pet owner's house window securely in place. In another version, the clips could be compressible wedge locks that securely hold the moving portion of the house window locked in a partially open position.

In the most preferred embodiment, the fan is a 12-volt DC current fan having 0.13 amps.

Also it is preferred that the tubing is flexible duct tube.

In another variation of the invention, the bug screen can be an air filter.

Finally, it is considered that the damping means and fan could be configured so as to force air in one direction on, rather than being unidirectional.

The following detail is now provided in reference to the drawing. As shown in FIG. 1, the inventive cat toilet includes the following construction. An intake port (1), attached to circular tubing for drawing air out from inside cat toilet enclosure 21. A line screen (2) consisting of wire mesh for filtering lint and cat hair out of exhaust air to keep from fouling fan 8. Fan 8 is preferably a 12 volt DC current fan and motor combination. Donut gasket (3) is used for sealing mounting flange 4 to cat toilet 21. Mounting flange 4 fixably attaches flex-tubing 6 to cat toilet enclosure 21. Hose clamp (5) is for tightening flex tubing 6 onto mounting flange 4 and outer housing 7. Flex tubing (6) is to flow intake air from intake port 1 to intake side of outer housing 7. Outer housing (7) is a circular compartment containing; damping disc 12, micro switch disc 11, micro switch 10, cam rod 14, cam 19, and fan motor 8. Fan mounting disc (9) acts as a disc with a air passage port securely fastened to the outer housing 7 to fixably attach the fan 8 to the inside of outer housing 7. Micro switch (10) is used to complete the connection of electric current to fan 8 when cam 19 is rotated to release pressure on micro switch 10. Micro switch disc (11) is a disc with an air passage port securely fastened to the outer housing 7 to allow air to pass the enter while holding the micro switch 10 securely in place. Damper (12) is a disc with a air passage port that is offset so as to align with the micro switch disc 11 when unit is on to allow exhaust air to flow through from intake port 1 to exhaust port On/off knob (13) is a knob fixably attached to the cam rod 14 which rotates damper 12 and cam lobe 19 controlling air flow and electric current to fan motor 8. Cam rod (14) includes a dowel passed rotatably through outer housing 7 fixably attached to damper 12 rotatably through micro switch disc 11 and fixably attached to cam lobe 19 for the purpose of controlling air flow, electric current, and to seal out backwash odors when unit is turned off. An angle fitting is used (15). In the preferred embodiment, a 90-degree angle fitting is used to change airflow from vertical to horizontal flow. Weather stripping means (16) is used to seal the window with the inventive device. Preferably, weather stripping means (16) is a rectangular piece of closed cell foam with a hole in it of a size to pass the exhaust port 18 through, the foam is then cut to fit into a partially open window held securely in place by at least one compressible wedge locking means. A bug screen (17) is then used. The bug screen (17) is a circular tubing of a size to removably attach over exhaust port 18 with a air passage port containing wire mesh of a size to prevent bugs from passing freely through to the inside of the home. Exhaust port (18) is a circular tube attached to outer housing 7 to allow air to flow from the exhaust side of fan 8 to the outside of the human house. Cam lobe (19) is a round disc with a flat sport on one side that maintains pressure on the micro switch lever 10 keeping the electric circuit open until rotated to flat spot which releases pressure on micro switch 10 completing electric current to fan motor 8.

In the preferred embodiment, an 110 vac/12 volt dc transformer (20) is used to power the system. In this embodiment, the system uses high voltage residential ac current and transforms it to low voltage dc current so that the invention is pet safe.

Cat toilet enclosure (21) is a rectangular box big enough to accommodate a cat and kitty litter container, with four walls, a bottom, a removable attached top 22, a hole of a size to fit intake port tubing 1 into, a hinged door 23 for a cat to pass through, and a locking means.

In the preferred embodiment, the cat toilet has a removable top (22) which can be a lid on top of the rectangular box to keep odors in the cat toilet so that the exhaust system transport them outside the human house.

Finally, hinged door (23) is a flap hinged at the top, cut smaller than the door opening to allow intake port air flow and swing back and forth as the cat goes in and out.

Additionally, top locking clamps (24) are metal clamps fixably attached to the rectangular box enclosure (21), which are bent in a manner so as to clamp the removable top in place.

What is claimed is:

1. A cat excrement odor exhaust system attachable to a house window for flowing air from inside a cat toilet to outside a house comprising:
   a port attachable to a house window having an intake side and an exhaust side;
   tubing attached to said intake side of said port and said exhaust side of said port and wherein said tubing attached to said intake side of said port is further connected to a cat toilet enclosure;
   damping means connected to said intake side of said port to regulate the amount of air flow from said cat toilet enclosure through said intake side of said port and connected to said tubing;
   a fan attached to said intake side of said port to cause air to flow through said damping means and into said intake side of said port, through said port, and into the exhaust side of said port and further into said tubing, which exhausts air outside of the house;
   cam means attached to the damping means attached to a micro switch which engages said fan, and wherein said damping means is adjusted to regulate the amount of air flow from inside said cat toilet enclosure to outside said house;
   connecting means disposed in said tubing connecting said micro switch and said fan to a power source;
   a bug screen removably attached to at least one end of said tubing to prevent bugs from freely moving through the said tubing to said house;
   wherein said cat toilet enclosure has four walls, a bottom, a removable top, a port to accept said tubing, a entry door with a curtain and a kitty litter tray.

2. The system of claim 1 further comprising at least one clip for removable locking said house window securely in place.

3. The system in claim 1 wherein said fan is a 12-volt DC current fan having 0.13 amps.

4. The system of claim 1, wherein said tubing is flexible duct tube.

5. The system of claim 2, wherein said at least one clip are compressible wedge locks that securely hold the moving portion of the house window locked in a partially open position.

6. The system of claim 1, wherein said bug screen is an air filter.

7. The system of claim 1, wherein said damping means and said fan force air in one direction.

* * * * *